(12) United States Patent
Mann et al.

(10) Patent No.: US 6,467,369 B1
(45) Date of Patent: Oct. 22, 2002

(54) GAS PEDAL

(75) Inventors: Thomas Mann, Nidderau; Herbert Severien, Schwalbach, both of (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/493,899

(22) PCT Filed: Feb. 4, 1999

(86) PCT No.: PCT/EP98/04554

§ 371 (c)(1),
(2), (4) Date: Apr. 25, 2000

(87) PCT Pub. No.: WO99/05582

PCT Pub. Date: Feb. 4, 1999

(30) Foreign Application Priority Data

Jul. 28, 1997 (DE) .......................................... 197 32 340

(51) Int. Cl.⁷ ................................................. G05G 1/14
(52) U.S. Cl. ........................................... 74/513; 74/514
(58) Field of Search ......................... 74/512, 513, 514, 74/560; 123/399; 267/41, 158

(56) References Cited

U.S. PATENT DOCUMENTS

| | | | | | |
|---|---|---|---|---|---|
| 4,510,906 A | * | 4/1985 | Klatt | ........................... | 74/513 |
| 5,396,870 A | * | 3/1995 | Beale | ........................... | 74/513 |
| 5,697,260 A | * | 12/1997 | Rixon et al. | ................... | 74/514 |
| 5,806,376 A | * | 9/1998 | Papenhagen et al. | ......... | 74/513 |
| 5,819,593 A | * | 10/1998 | Rixon et al. | ................... | 74/514 |
| 5,868,040 A | * | 2/1999 | Papenhagen et al. | ......... | 74/513 |
| 5,934,152 A | * | 8/1999 | Aschoff et al. | ............... | 74/513 |
| 5,964,125 A | * | 10/1999 | Rixon et al. | ................... | 74/514 |
| 6,023,995 A | * | 2/2000 | Riggle | ........................... | 74/514 |
| 6,070,490 A | * | 6/2000 | Aschoff et al. | ............... | 74/513 |
| 6,089,120 A | * | 7/2000 | Lochle et al. | ................. | 74/514 |
| 6,164,155 A | * | 12/2000 | Tonissen et al. | .............. | 74/514 |
| 6,186,025 B1 | * | 2/2001 | Engelgau et al. | ............. | 74/514 |
| 6,209,418 B1 | * | 4/2001 | Kalsi et al. | ................... | 74/514 |

* cited by examiner

Primary Examiner—David A. Bucci
Assistant Examiner—Chong H. Kim
(74) Attorney, Agent, or Firm—Mayer, Brown & Platt

(57) ABSTRACT

A gas pedal for a motor vehicle has a pedal arm which is mounted pivotably in a holding part and has a restoring device, which slides along the rear side of the pedal arm, and a damping element for damping the movement of the pedal arm. A setpoint generator generates, from the relative movement of the pedal arm with respect to the restoring device, electric signals which can be varied as a function of position.

21 Claims, 3 Drawing Sheets

GAS PEDAL

DESCRIPTION

Figure 1:
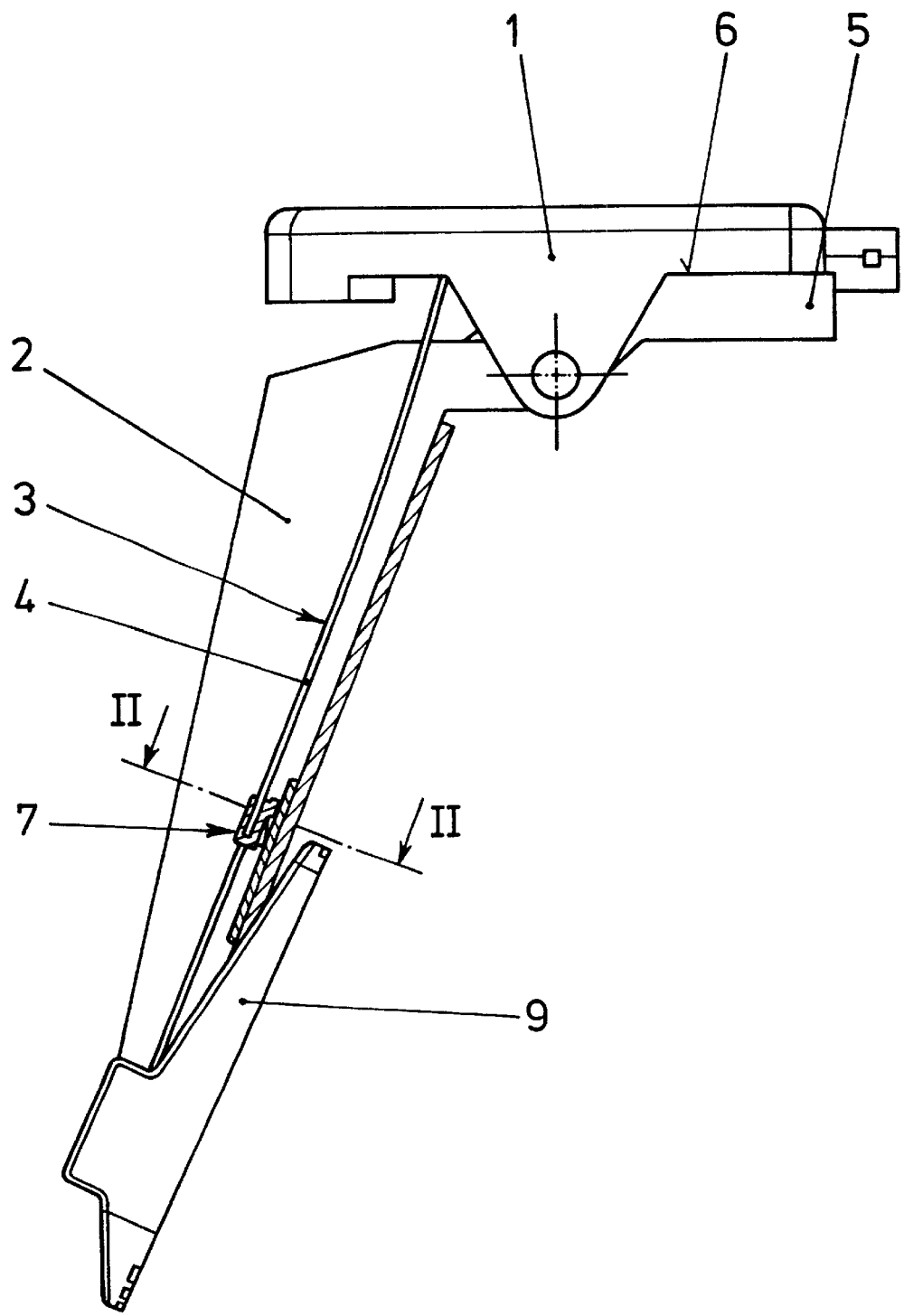

The invention relates to a gas pedal having a pedal arm which is held by a holding part and which can be deflected by an actuating force and can be pivoted back into an initial position by a restoring device which has a spring element, having a setpoint generator for generating an electric signal which can be varied as a function of the position of the pedal arm, and having a damping element for generating damping during movement of the pedal arm.

Gas pedals of this general type are frequently used in today's motor vehicles and are therefore generally known. In known gas pedals, the pedal arm is fastened on a joint which is arranged on the holding part and is prestressed in the initial position by two spiral-shaped or helical restoring springs which comprise the spring element of the restoring device. The damping element generally has a friction pad which is prestressed against a friction coating. When the pedal arm is pressed down, the friction pad slides over the friction coating and thereby prevents smaller movements from being transmitted undamped to the setpoint generator. When the pedal arm is pressed down, the damping element has to generate a greater resistance than when the pedal arm is released. Because of this the damping element has a hysteresis which makes it possible for the pedal arm to be reliably pivoted back into the initial position. However, a damping element of this type is very complicated to manufacture and is susceptible to faults. Furthermore, a gas pedal of this type consists of very many components which are complicated to manufacture and to fit.

DE 195 36 605 A1 discloses a gas pedal module having a leaf restoring spring. The leaf spring bears with one free end against the pedal arm but is installed in such a manner that its free end which bears against the pedal arm is displaced only insubstantially, if at all, with respect to said pedal arm. A separate friction damper is provided.

The present invention is based on the problem of further simplifying a gas pedal of the abovementioned type.

According to the invention, this problem is solved in that, as the pedal arm moves in the region of the sliding contact, a defined relative movement with respect to the restoring device occurs. With this design, the necessary damping of the movement of the pedal arm is generated by the restoring device sliding along the pedal arm. As a result, the gas pedal according to the invention no longer requires any additional damping element. The restoring device could, for example, be a leaf spring which is mounted by one end in the holding part. The gas pedal according to the invention therefore consists of particularly few components, which can be fitted in a particularly simple and cost-effective manner. Moreover, the gas pedal may either be fixed in the motor vehicle in a suspended or floor-mounted manner.

The setpoint generator of the known gas pedal generally has a rotary potentiometer arranged in the joint of the pedal arm. Consideration might be given to designing the setpoint generator of the gas pedal according to the invention in the same manner as that of the known gas pedal. However, this causes tolerances in the mounting of the pedal arm to act directly on the setpoint generator, with the result that precise determination of the position of the pedal arm is not possible. According to an advantageous development of the invention, however, the setpoint generator makes it possible with particular reliability to determine the position of the pedal arm if said setpoint generator is designed for detecting the relative movement between the pedal arm and that region of the restoring device which bears in a sliding manner against the pedal arm. By means of this design, the pedal arm may, moreover, either be mounted pivotably on a joint, as in the case of the known gas pedal, or may itself be designed as a further leaf spring and fastened in the holding part.

According to another advantageous development of the invention, an intended damping of the movement of the pedal arm can be produced in a simple manner by the pedal arm having a friction coating in its region which bears against the restoring device. Moreover, by making a suitable choice of the friction-coating material having coefficients of friction which differ as a function of direction, it is possible in a very simple manner to generate a hysteresis by means of which the pressing-down of the pedal arm is damped more strongly than the return movement into the initial position.

The gas pedal according to the invention becomes structurally very simple if the restoring device is designed for actuating a potentiometer of the setpoint generator, which potentiometer is arranged on the pedal arm. A further advantage of this design resides in the fact that a slideway of the potentiometer can be of particularly large dimensions, so that the position of the pedal arm can be particularly precisely determined. If, for the purpose of redundancy, a potentiometer having a plurality of slideways is used, said slideways are of the same length, so that measurement errors are kept particularly low. Instead of a potentiometer it is also possible to use feedback systems which act in a non-contacting manner, for example capacitive or inductive displacement sensors, which are less susceptible to wear but are more expensive.

According to another advantageous development of the invention, the pedal arm is particularly reliably pivoted back into the initial position if the spring element of the restoring device has two leaf springs mounted in the holding part. Fastening the spring elements in the holding part also assists in further reducing the manufacturing costs of the gas pedal according to the invention. Of course, instead of leaf springs, use could also be made of two torsion springs which prestress an actuating lever against the pedal arm.

According to another advantageous development of the invention, the pedal arm has particularly high stability if it has a U-shaped cross section.

According to another advantageous development of the invention, the lateral guiding of the restoring device with respect to the pedal arm becomes particularly cost-effective, without guide elements which have additionally to be fitted, if that region of the restoring device which bears against the pedal arm likewise has a U-shaped cross section and is nested together with the U-shaped region of the pedal arm one into the other.

In the case of the pedal arm of U-shaped design, the damping element can be provided with very large dimensions if the damping element has spring elements which are fastened on the restoring device and are prestressed against the limbs of the U-shaped region of the pedal arm. A further advantage of this design resides in the fact that the forces of the spring elements are supported on mutually opposite sides of the restoring device. This allows intended friction to be adjusted in a particularly simple manner.

According to another advantageous development of the invention, the setpoint generator becomes particularly cost-effective if a slideway of the potentiometer of the setpoint generator is arranged in the base of the pedal arm and if the restoring device has a sliding contact which is prestressed against the slideway.

According to another advantageous development of the invention, raising of the pedal arm from the restoring device can be avoided in a simple manner if the pedal arm or the restoring device in each case has a groove in the limbs and the other component has pegs which engage into the grooves. This guides the pedal arm in a particularly reliable manner with respect to the restoring device.

According to another advantageous development of the invention, the setpoint generator has a particularly long-lasting working life if the slideway of the potentiometer has a ceramic substrate as base material.

The costs for manufacturing the gas pedal according to the invention can be reduced in a simple manner by means of an electrically conducting plastic on the upper side of the slideway of the potentiometer.

In the case of motor vehicles having automatic transmission, an increased resistance when the gas pedal is almost entirely pressed down signals the so-called kick-down threshold to the driver. If the gas pedal is pressed down beyond this threshold, the automatic transmission generally shifts down for the purpose of increased acceleration. In the gas pedal according to the invention, the kick-down threshold can be produced in a simple manner by the pedal arm having a projection which protrudes toward the restoring device and by the restoring device sliding against the projection when the pedal arm is almost entirely pressed down. The intended resistance of the kick-down threshold can be adjusted in a simple manner by the shaping of the projection (edge steepness). Then, for generating electric signals of the kick-down threshold, the setpoint generator could, for example, have a switching element for generating an electric signal when the pedal is almost entirely pressed down.

Near to the pedal plate, the pedal arm may produce undesirable vibrations which are not to be transmitted to the setpoint generator. These vibrations are effectively damped if the setpoint generator is designed for detecting a deformation of the spring element of the restoring device.

According to another advantageous development of the invention, the setpoint generator is particularly insusceptible to the accumulation of dirt if the setpoint generator has a resistance strain gage arranged on the spring element.

The gas pedal according to the invention can be completely preassembled if the idle-speed stop for the pedal arm is provided on the holding part.

The holding part could, for example, be punched from steel sheet. The holding part would thereby have particularly high stability. In a lightweight variant, the holding part is manufactured from plastic by injection molding.

The invention permits numerous embodiments. To further clarify its basic principle a number of these are represented in the drawing and are described below. The drawing shows in FIG. 1 a longitudinal sectional view of a gas pedal according to the invention, FIG. 2 a sectional representation of the gas pedal from FIG. 1, along the line II—II, FIG. 3 a sectional representation of a further embodiment of the gas pedal according to the invention, in the region of a setpoint generator, FIG. 4 a further embodiment of the gas pedal according to the invention.

FIG. 1 shows a gas pedal according to the invention for a motor vehicle, having a pedal arm 2 which is pivotably mounted in a holding part 1 and is in a suspended installation position. The pedal arm 2 is prestressed by a restoring device 3 having a restoring device spring element 4 into an initial position in which a lever 5 of the pedal arm 2 bears against an idle-speed stop 6 of the holding part 1. Furthermore, the gas pedal according to the invention has a setpoint generator 7 which generates electric signals which can be varied as a function of the position of the pedal arm 2. The pedal arm 2 can be deflected against the force of the restoring device spring element 4 by pressure on a pedal plate 9.

Figure 2:
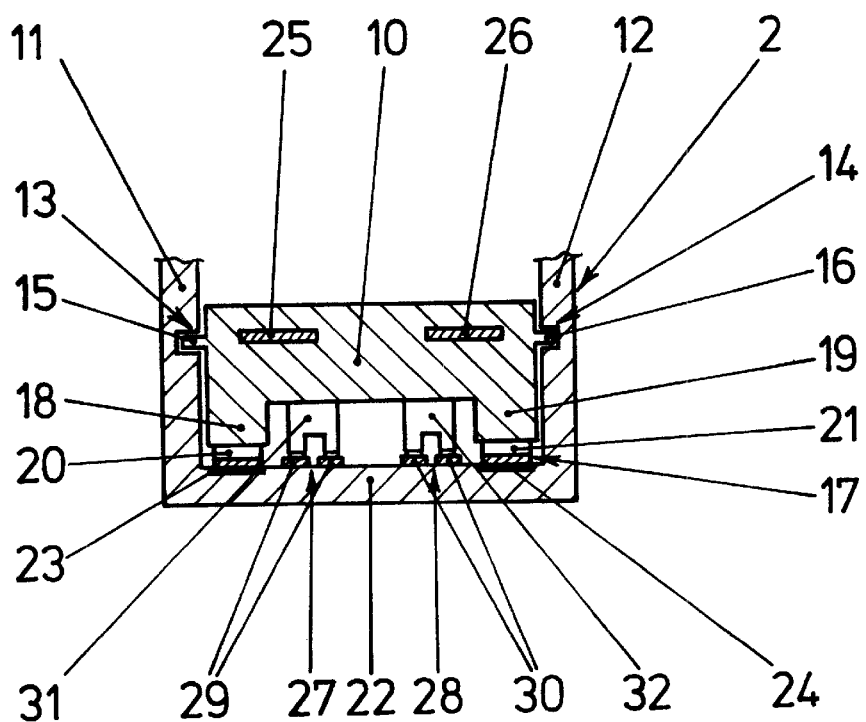

FIG. 2 shows, in a sectional representation along the line II—II through the gas pedal according to the invention from FIG. 1, that the cross sections of the pedal arm 2 and a guide part 10 of the restoring device 3 are in each case of U-shaped design. For guiding the restoring device 3, there are incorporated in the limbs 11, 12 of the pedal arm 2 grooves 13, 14 into which pegs 15, 16 of the guide part 10 of the restoring device 3 engage. Furthermore, the gas pedal according to the invention has a damping element 17 having damping spring elements 20, 21 which are fastened on the limbs 18, 19 of the guide part 10 and are prestressed against friction coatings 23, 24 arranged on the base 22 of the pedal arm 2. A hysteresis of the damping element is achieved by its frictional force increasing together with the spring force as the pedal arm 2 is pressed down and correspondingly dropping when said pedal arm is released. The restoring device spring element 4 of the restoring device 3 comprises two leaf springs 25, 26, as a result of which the pedal arm 2 is reliably pivoted back into the initial position even if one of the leaf springs 25, 26 breaks. For redundancy purposes, the setpoint generator 7 has two potentiometers 27, 28 which are arranged next to each other and in each case have two slideways 29, 30 against which sliding contacts 31, 32, which are fastened on the guide part 10 of the restoring device 3, are prestressed.

Figure 3:
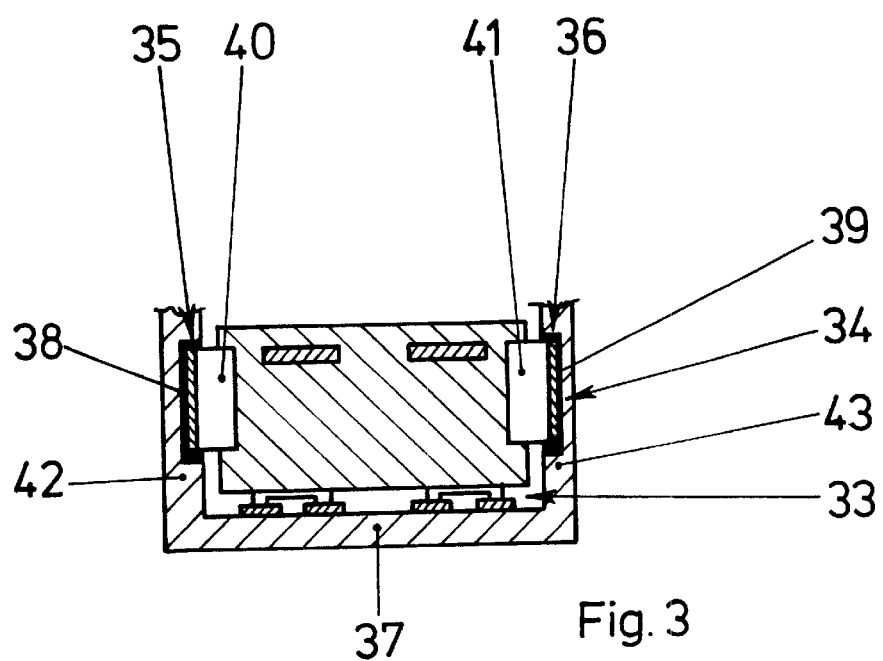

FIG. 3 shows a sectional representation through a setpoint generator 33 and a damping element 34 of a further embodiment of the gas pedal according to the invention. The damping element 34 has two damping spring elements 40, 41 which are guided in grooves 35, 36 of a pedal arm 37 of U-shaped design and are prestressed against friction coatings 38, 39. The grooves 35, 36 are arranged in the insides of the limbs 42, 43 of the pedal arm 37.

Figure 4:
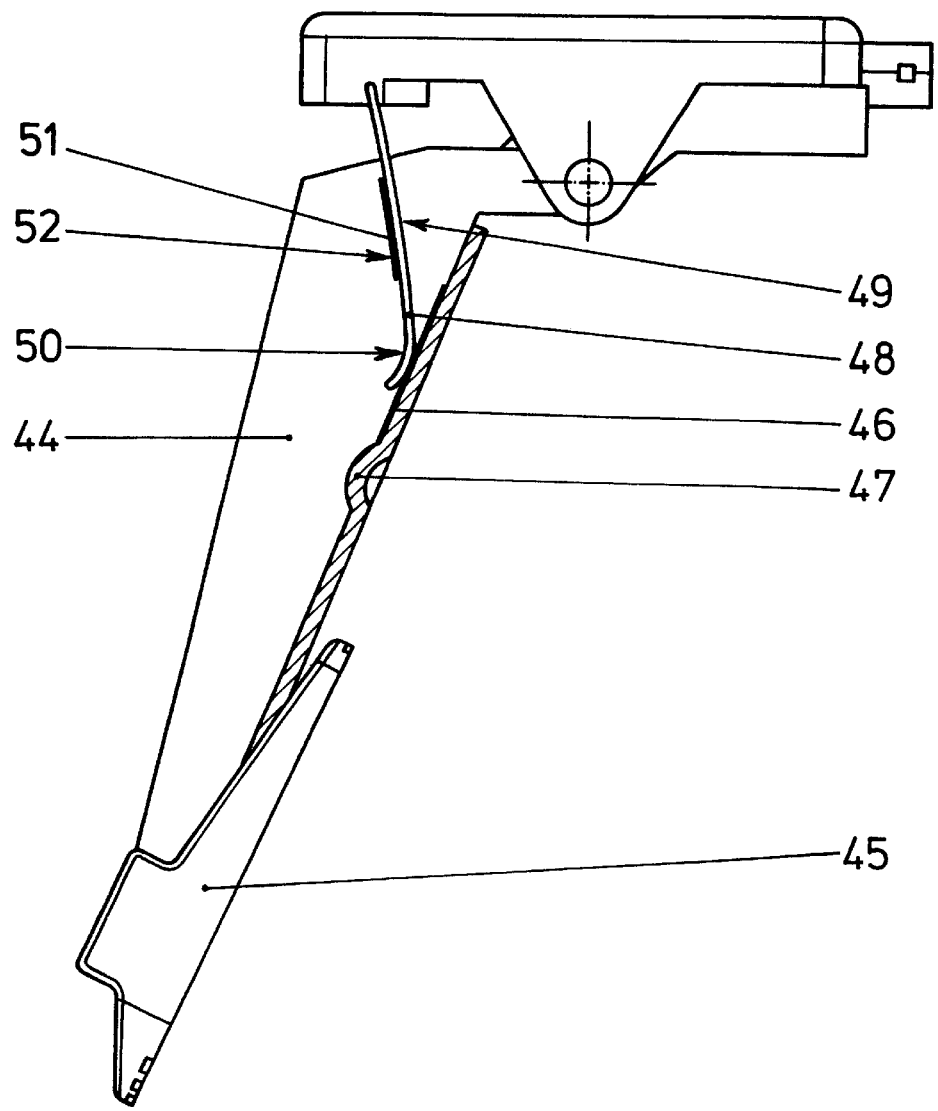

FIG. 4 shows a further embodiment of the gas pedal according to the invention which is intended for a motor vehicle having automatic transmission. A pedal arm 44 of the gas pedal has a friction coating 46 on its side which faces away from a pedal plate 45 and is restricted by a projection 47. A restoring device spring element 48 of a restoring device 49 is prestressed against the friction coating 46. The restoring device 49 is therefore designed in one piece with a damping element 50 which damps the movement of the pedal arm 44. When the pedal arm 44 is almost entirely pressed down, the restoring device spring element 48 comes up against the projection 47, which is made noticeable to a driver of the motor vehicle as increased resistance. The resistance can be adjusted virtually as desired by the shape of the projection 47. A resistance strain gage 51 is arranged on the restoring device spring element 48 as the setpoint generator 52. The resistance strain gage 51 generates electric signals which can be varied as a function of the deformation of the restoring device spring element 48.

In a variant (not shown) of this gas pedal, instead of the potentiometer, displacement sensors which act in a non-contacting manner and are less susceptible to wear could be provided between the restoring spring and pedal arm parallel to and in the region of the friction damping.

What is claimed is:

1. A gas pedal comprising:
   a holding part;
   a pedal arm which is held by the holding part; and
   a restoring device in sliding contact with the pedal arm, wherein the restoring device produces an actuating force that automatically pivots the pedal arm back into an initial position, comprising:
   a sliding contact in contact with the pedal arm, wherein the pedal arm moves with respect to the restoring device in the region of the sliding contact creating a defined relative movement,
   a restoring device spring element,
   a setpoint generator attached to the restoring device spring element, wherein the setpoint generator generates an electrical signal which can be varied as a function of the position of the pedal arm, and
   a damping element which dampens movements of the pedal arm by using the defined relative motion.

2. The gas pedal as claimed in claim 1, wherein the pedal arm has a friction coating in the region of the sliding contact.

3. The gas pedal as claimed in claim 2, wherein the friction coating comprises a material having coefficients of friction which differ as a function of direction.

4. The gas pedal as claimed in claim 3, wherein the setpoint generator detects a relative movement between the pedal arm and the restoring device.

5. The gas pedal as claimed in claim 4, wherein the setpoint generator further comprises at least one potentiometer arranged on the pedal arm, wherein the restoring device actuates the potentiometer.

6. The gas pedal as claimed in claim 5, wherein the pedal arm further comprises a base, wherein the sliding contact is on the base, each of the at least one potentiometers further comprises at least one slideway arranged in the base wherein the base is prestressed against the sliding contact.

7. The gas pedal as claimed in claim 5, wherein the sliding contact comprises a ceramic substrate.

8. The gas pedal as claimed in claim 5, wherein the sliding contact comprises an electrically conducting plastic.

9. The gas pedal as claimed in claim 5, wherein the spring element comprises at least two leaf springs mounted in the holding part.

10. The gas pedal as claimed in claim 5, wherein the pedal arm comprises a pedal arm U-shaped cross section.

11. The gas pedal as claimed in claim 10, wherein the restoring device comprises a restoring device U-shaped cross section that engages into the U-shaped region of the pedal arm.

12. The gas pedal as claimed in claim 10, wherein the pedal arm U-shaped cross section comprises at least one limb, and the damping element comprises damping spring elements which are fastened on the restoring device and are prestressed against the limbs.

13. The gas pedal as claimed in claim 11, wherein the pedal arm U-shaped cross section comprises at least one limb and the pedal arm further comprises at least one groove in at least one of the limbs and the restoring device comprises pegs in equal number to the grooves wherein the pegs engage into the grooves.

14. The gas pedal as claimed in claim 1, wherein the pedal arm has a projection, which protrudes toward the restoring device, as an over-compressible kick-down threshold against which the restoring device runs when the pedal arm is almost entirely pressed down.

15. The gas pedal as claimed in claim 14, wherein the setpoint generator detects a deformation of the spring element of the restoring device.

16. The gas pedal as claimed in claim 15, wherein the setpoint generator comprises a resistance strain gage arranged on the spring element.

17. The gas pedals as claimed in claim 1, wherein the setpoint generator comprises a noncontact displacement sensor, which detects the relative movement between the pedal arm and the restoring device.

18. The gas pedal as claimed in claim 1, wherein the holding part has an idle-speed stop.

19. The gas pedal as claimed in claim 1, wherein the holding part comprises plastic and is manufactured by injection molding.

20. A gas pedal comprising
    a holding part;
    a pedal arm which is held by the holding part; and
    a restoring device wherein the restoring device produces an actuating force that automatically pivots the pedal arm back into an initial position, comprising:
    a sliding contact in contract with the pedal arm, wherein the pedal arm moves with respect to the restoring device in the region of the sliding contact,
    a restoring device spring element,
    a setpoint generator attached to the restoring device spring element, wherein the setpoint generator generates an electric signal which can be varied as a function of the position of the pedal arm, and
    a damping element for damping movements of the pedal arm wherein the damping of the movements of the pedal arm is produced by a relative movement of the pedal arm with respect to the restoring device.

21. The gas pedal as claimed in claim 12, wherein at least one of the limbs comprises at least one peg and wherein the restoring device further comprises grooves in equal number to the pegs, wherein the pegs engage into the grooves.

* * * * *

UNITED STATES PATENT AND TRADEMARK OFFICE
CERTIFICATE OF CORRECTION

PATENT NO.    : 6,467,369 B1
DATED         : October 22, 2002
INVENTOR(S)   : Mann et al.

It is certified that error appears in the above-identified patent and that said Letters Patent is hereby corrected as shown below:

<u>Title page,</u>
Item [22], Filing Date should be -- July 21, 1998 --

Signed and Sealed this

First Day of April, 2003

JAMES E. ROGAN
*Director of the United States Patent and Trademark Office*